United States Patent
Nishimura et al.

[11] Patent Number: 6,032,756
[45] Date of Patent: Mar. 7, 2000

[54] MOTOR-DRIVEN POWER STEERING SYSTEM FOR MOTOR VEHICLE

[75] Inventors: Hiroshi Nishimura; Takayuki Kifuku; Shunichi Wada, all of Tokyo, Japan

[73] Assignee: Mitsubishi Denki Kabushiki Kaisha, Tokyo, Japan

[21] Appl. No.: 08/864,514

[22] Filed: May 28, 1997

[30] Foreign Application Priority Data

May 28, 1996 [JP] Japan ................................. 8-133776

[51] Int. Cl.⁷ .................................................. B62D 5/04
[52] U.S. Cl. ........................................ 180/446; 180/443
[58] Field of Search ............................. 180/446, 443; 701/41, 42

[56] References Cited

U.S. PATENT DOCUMENTS

| | | | |
|---|---|---|---|
| 5,563,790 | 10/1996 | Wada et al. | 180/446 |
| 5,720,361 | 2/1998 | Nishimoto et al. | 180/446 |
| 5,761,627 | 6/1998 | Seidel et al. | 180/443 |
| 5,788,010 | 8/1998 | Mukai et al. | 180/443 |
| 5,835,872 | 11/1998 | Matsuoka et al. | 701/41 |
| 5,839,537 | 11/1998 | Nishino et al. | 180/443 |
| 5,845,222 | 12/1998 | Yamamoto et al. | 701/41 |

FOREIGN PATENT DOCUMENTS

| | | |
|---|---|---|
| 654 393 | 5/1995 | European Pat. Off. . |
| 7-17423 | 1/1995 | Japan . |
| 7-137651 | 5/1995 | Japan . |
| 7-257417 | 10/1995 | Japan . |

Primary Examiner—J. J. Swann
Assistant Examiner—Michael Cuff
Attorney, Agent, or Firm—Sughrue, Mion, Zinn, Macpeak & Seas, PLLC

[57] ABSTRACT

A motor-driven power steering system for a motor vehicle implemented inexpensively in a simplified structure allows operation of a steering assist torque generating motor even in the vicinity of a neutral point while preventing rotation of the motor in a direction reverse to the steering direction as well as self-rotation of a steering wheel notwithstanding of occurrence of abnormality in a controller implemented by a CPU. The motor-driven power steering system includes a CPU (3) for controlling a motor (2) in dependence on output of a steering torque detecting unit (1), an interlock means (5) for limiting driving operation of the motor (2) upon occurrence of abnormality in the CPU (3), and a motor driving means (6) for driving the motor (2) in accordance with commands issued by the CPU (3).

13 Claims, 16 Drawing Sheets

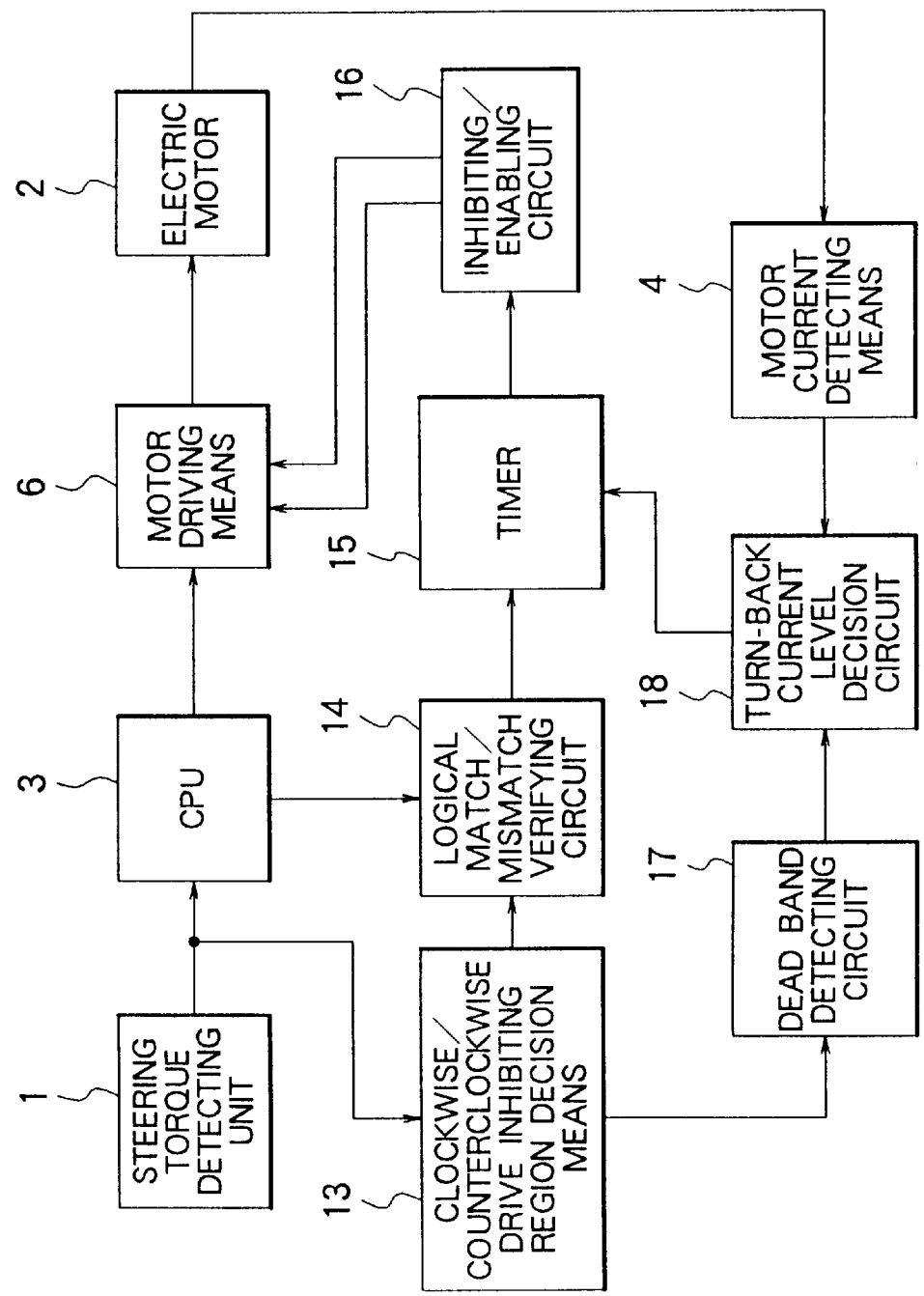

MOTOR-DRIVEN POWER STEERING SYSTEM FOR MOTOR VEHICLE

BACKGROUND OF THE INVENTION

1. Field of the Invention

The present invention relates to a control apparatus for a motor-driven power steering system which is adopted in automobiles or motor vehicles for assisting a driver in manipulating a steering wheel by using an electric motor.

2. Description of Related Art

As a means for securing safety upon occurrence of a failure in a controller implemented by a microcomputer or the like for controlling a motor-driven power steering system of a motor vehicle, there is known an apparatus in which match or mismatch between a direction of steering torque and a driving direction of an electric motor is detected, and when the mismatch is detected, a time period during which the mismatch continues to exist is measured, wherein operation of the driving motor is disabled or inhibited in case the time period mentioned above exceeds a predetermined value, as is disclosed, for example, in Japanese Unexamined Patent Application Publication No. 137651/1995 (JP-A-7-137651).

For having better understanding of the concept of the invention, technical background thereof will be elucidated below in some detail. FIG. 19 is a schematic block diagram showing a general arrangement of a motor-driven power steering system set forth in claim 1 of the aforementioned Japanese Unexamined Patent Application Publication No. 137651/1995 (JP-A-7-137651). Referring to the figure, the motor-driven power steering system is comprised of a steering torque detecting unit 1 for detecting a steering torque applied to a steering wheel by a driver, an electric motor 2 for generating an assist torque for aiding the driver in his or her steering operation, a CPU 3 serving as a control means for outputting a motor drive signal for controlling the motor 2 in dependence on the output of the steering torque detecting unit 1, a clockwise/counterclockwise drive inhibit region decision means 13 for deciding that the output of the steering torque detecting unit 1 lies in a region for inhibiting the driving operation of the electric motor in the clockwise direction or counterclockwise direction, a logical match/mismatch verifying circuit 14 for logically deciding whether the direction of the steering torque matches or mismatches the driving direction of the motor 2 on the basis of the output of the clockwise/counterclockwise drive inhibit region decision means 13 and a motor driving direction command signal issued by the CPU 3, a timer 15 for measuring a time duration or period for which the logical mismatch state detected by the logical match/mismatch verifying circuit 14 continues to exist, an inhibiting/enabling circuit 16 for disabling or inhibiting the driving operation of the motor 2 when the time period measured by the timer 15 exceeds a predetermined value, and a motor drive means 6 for driving the motor 2 in accordance with a motor driving signal issued by the CPU 3 when driving of the motor 2 is not inhibited by the inhibiting/enabling circuit 16 while disabling the driving operation of the motor when the inhibiting/enabling circuit 16 outputs a signal inhibiting the driving operation of the motor 2.

Further, the motor-driven power steering system mentioned above may include a motor current detecting means 4 for detecting a current flowing through the motor 2, a dead band detecting circuit 17 for detecting that the steering torque lies within a dead band, and a turn-back current level decision circuit 18 for deciding whether or not the current flowing through the motor 2 upon turning back the steering wheel is excessively large when the detected value outputted from the current detecting means 4 lies within the dead band, as set forth in claim 4 of the aforementioned application.

Now, description will be directed to the hitherto known motor-driven power steering system implemented in the structure mentioned above.

In general, the motor-driven power steering system is designed to drive the electric motor in a direction for reducing the steering effort of the driver in dependence on the steering torque applied to the steering wheel by the driver by increasing the motor current and hence the assist torque as the steering torque increases. Besides, the motor-driven power steering system is so arranged that the control value for the motor current for a given steering torque can be changed or modified in dependence on the speed of the motor vehicle.

Let's assume, by way of example, that a driver rotates slowly the steering wheel in one direction, starting from a neutral point. In that case, the direction of the steering torque coincides with the driving direction of the motor 2. Consequently, output of the logical match/mismatch verifying circuit 14 indicates logical match. Accordingly, the timer 15 is not activated with the driving operation of the motor 2 being enabled by the inhibiting/enabling circuit 16. Thus, the motor 2 is driven in accordance with the motor driving signal outputted from the CPU 3.

On the other hand, when the steering wheel is turned back to the neutral point after the steering operation by driving the motor 2 in the state in which the steering torque lies within the dead band, the output of the logical match/mismatch verifying circuit 14 indicates logical mismatch. Consequently, the timer 15 is activated. After lapse of a time preset at the timer 15, the inhibiting/enabling circuit 16 inhibits the driving operation of the motor 2. However, by selecting the time set at the timer 15 to be longer than the time for which the motor 2 is driven in the dead band or alternatively selecting the time for driving the motor 2 shorter than the time set at the timer 15, the driving operation of the motor 2 is not inhibited by the inhibiting/enabling circuit 16. In that case, the motor 2 can be driven in accordance with the motor driving signal outputted from the CPU 3.

When a failure or abnormality takes place in the controller or CPU 3, the motor-driven power steering system operates such that a motor driving signal of magnitude which allows self-rotation of the steering wheel is outputted continuously independent of the steering torque. In general, three operation modes 1), 2) and 3) mentioned below of the motor-driven power steering system may be conceived.

1) When the driver is manipulating the steering wheel with his or her hands and when the direction of the steering torque coincides with the driving direction of the motor 2, the output of the logical match/mismatch verifying circuit 14 indicates logical match. Consequently, the timer 15 is not activated while the inhibiting/enabling circuit 16 enables the driving operation of the motor 2. Thus, the steering operation can be aided by the assist torque generated by the motor 2.

2) By contrast, when the driver manipulates the steering wheel and when the direction of the steering torque does not coincide with that of the driving direction of the motor 2, then the output of the logical match/mismatch verifying circuit 14 indicates logical mismatch, as a result of which the timer 15 is activated. Before the time set at the timer 15 elapses, the inhibiting/enabling circuit 16 does not inhibit the driving operation of the motor 2. Thus, the motor 2 generates a torque in the direction opposite to the steering direction. Consequently, load encountered in the steering operation increases. On the other hand, after the time set at the timer 15 has lapsed, the driving operation of the motor 2 is no more inhibited by the inhibiting/enabling circuit 16. Thus, the motor 2 stops generation of the torque. Consequently, the steering wheel can be manipulated only manually.

3) When the steering torque lies within the dead band with the driver releasing the steering wheel, the output of the logical match/mismatch verifying circuit 14 indicates logical mismatch, triggering operation of the timer 15. Before the time set at the timer 15 elapses, the inhibiting/enabling circuit 16 does not inhibit the driving operation of the motor 2. Consequently, the motor 2 generates a torque for forcing the steering wheel to rotate by itself (i.e., self-rotation without being manipulated by the driver). However, after the time set at the timer 15 has lapsed, the inhibiting/enabling circuit 16 inhibits driving operation of the motor 2 which can then generate no torque. Consequently, by selecting the time set at the timer 15 to be adequately short, self-rotation of the steering wheel (i.e., rotation of the steering wheel in the released state of the steering wheel) can be prevented.

Further, in the motor-driven power steering system equipped with the motor current detecting means 4, the dead band detecting circuit 17 and the turn-back current level decision circuit 18, the state in which the steering torque lies within the dead band is detected by the dead band detecting circuit 17. When the steering torque lies within the dead band and when the detected value of the motor current as detected by the motor current detecting means 4 is smaller than a predetermined value, the timer 15 is reset by the turn-back current level decision circuit 18, whereby the temporal restriction imposed onto the driving operation of the motor 2 in the dead band is cleared.

The conventional motor-driven power steering system described above suffers a problem that the driving operation of the motor 2 can be inhibited only with a delay from occurrence of abnormality in the CPU 3 because the driving operation of the motor 2 is inhibited or disabled after lapse of the time preset at the timer 15. In particular, when the direction of the steering torque does not coincide with the driving direction of the motor 2 and when the time preset at the timer 15 does not yet lapsed, a torque of the direction reverse to the steering direction is generated by the motor 2, incurring a problem that the steering operation encounters heavy load.

Additionally, in the case of the conventional motor-driven power steering system which is not equipped with the motor current detecting means 4, the dead band detecting circuit 17 and the turn-back current level decision circuit 18, the control for turning back the steering wheel toward the neutral point after the steering operation will encounter difficulty when the time preset at the timer 15 is selected short. Namely, when the motor 2 is to be driven continuously in the state where the steering torque lies within the dead band, the driving operation of the motor 2 is inhibited by the inhibiting/enabling circuit 16, giving rise to another problem. On the other hand, when the preset time is selected long, the motor driving signal for allowing self-rotation of the steering wheel is continuously outputted regardless of the steering torque when abnormality takes place in the CPU 3. Consequently, the time taken for the driving operation of the motor 2 to be inhibited by the inhibiting/enabling circuit 16 becomes long, to another disadvantage.

In the case of the motor-driven power steering system equipped with the motor current detecting means 4, the dead band detecting circuit 17 and the turn-back current level decision circuit 18, there is no necessity for limiting temporally the driving operation of the motor 2 in the dead band, e.g. in the turn-back steering. However, the structure of the motor-driven power steering system is much complicated with the number of components being increased, presenting a problem that the cost involved in manufacturing the motor-driven power steering system increases.

SUMMARY OF THE INVENTION

In the light of the state of the art described above, it is a general object of the present invention to provide an improved motor-driven power steering system which is substantially immune to the problems mentioned above.

In particular, it is an object of the present invention to provide a motor-driven power steering system which can ensure enhanced steering comfortableness by allowing the electric motor to be driven without undergoing temporal limitation in the dead band.

Another object of the present invention is to provide a motor-driven power steering system in which such undesirable situation can be avoided that the electric motor is driven in a direction reverse to the steering direction or the steering wheel rotates by itself in the released state due to occurrence of abnormality in the control means such a microprocessor or CPU.

Still another object of the present invention is to provide a motor-driven power steering system which can be implemented inexpensively in a simplified structure.

In view of the above and other objects which will become apparent as the description proceeds, there is provided according to a first aspect of the present invention a motor-driven power steering system for a motor vehicle, which system includes a steering torque detecting means for detecting a steering torque applied to a steering wheel by a driver, an electric motor for applying an assist torque to a steering mechanism for thereby assisting the driver in steering operation, a control means for outputting a motor driving signal for driving the motor in dependence on the output of the steering torque detecting means, an interlock means for enabling or inhibiting a driving direction of the motor in dependence on the output of the steering torque detecting means, a motor driving means for driving the motor in the direction enabled by the interlock means in accordance with the motor driving signal while disabling driving operation of the motor in a direction inhibited by the interlock means, and a motor current detecting means for measuring a current flowing through the electric motor, wherein a threshold value referenced by the interlock means in decision for enabling or inhibiting the driving direction of the motor is changed in accordance with the detected value of the motor current.

In a preferred mode for carrying out the invention, the motor-driven power steering system may further include a filtering means for changing temporally the detected value of the motor current. In that case, the threshold value referenced by the interlock means in the decision for enabling or inhibiting the driving direction of the motor can be changed in accordance with output of the filtering means.

In another preferred mode for carrying out the invention, characteristic of the filtering means can be changed in dependence on the detected value of the motor current.

In yet another preferred mode for carrying out the invention, decision of the interlock means for enabling or inhibiting the driving direction of the motor may be made with hysteresis.

In still another preferred mode for carrying out the invention, the threshold value referenced by the interlock means in the decision for enabling or inhibiting the driving direction of the motor can be so changed that a range in which an inhibiting signal for inhibiting the driving direction is outputted is enlarged when the motor current is large.

In a further preferred mode for carrying out the invention, the threshold value referenced by the interlock means in the decision for enabling or inhibiting the driving direction of the motor can be changed on the basis of result of the decision as to whether the motor current is large or small.

In a yet further preferred mode for carrying out the invention, decision as to whether the motor current is large or small may be made with hysteresis.

In a still further preferred mode for carrying out the invention, a threshold value referenced by the interlock means in the decision for enabling or inhibiting the driving direction of the motor can be changed when a state represented by the result of the decision as to whether the motor current is large or small exists continuously for a predetermined time.

In a further preferred mode for carrying out the invention, the motor-driven power steering system may further include a phase compensation circuit for compensating phase of output of the-steering torque detecting unit. In that case, the interlock means may be so designed as to enable or inhibit the driving direction of the motor in dependence on the output of the phase compensation circuit.

In a yet further preferred mode for carrying out the invention, the motor-driven power steering system may further include a steering angle detecting means for detecting a steering angle of a steering wheel. In that case, the threshold value referenced by the interlock means in the decision for enabling or inhibiting the driving direction of the motor can be so changed that a range in which an inhibiting signal for inhibiting the driving direction is outputted is enlarged, when the steering angle is greater than a predetermined value.

In a still further preferred mode for carrying out the invention, the motor-driven power steering system may further include a steering angular velocity detecting means for detecting a steering angular velocity of a steering wheel. In that case, the threshold value referenced by the interlock means in the decision for enabling or inhibiting the driving direction of the motor can be so changed that a range in which an inhibiting signal for inhibiting the driving direction is outputted is enlarged, when the steering angular velocity is higher than a predetermined value.

In another preferred mode for carrying out the invention, the motor-driven power steering system may further include a motor vehicle speed detecting means for detecting a running speed of the motor vehicle. In that case, the threshold value referenced by the interlock means in the decision for enabling or inhibiting the driving direction of the motor can be so changed that a range in which an inhibiting signal for inhibiting the driving direction is outputted is enlarged when the running speed of the motor vehicle is higher than a predetermined value.

In yet another preferred mode for carrying out the invention, the motor-driven power steering system may further include a motor-applied voltage detecting means for detecting a voltage applied to the motor in place of the motor current detecting means. In that case, the threshold value referenced by the interlock means in the decision for enabling or inhibiting the driving direction of the motor may be changed in dependence on the detected value of the motor-applied voltage instead of the detected value of the motor current.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 19 is a schematic block diagram showing a general arrangement of a conventional motor-driven power steering system.

DESCRIPTION OF THE PREFERRED EMBODIMENTS

Figure 1:
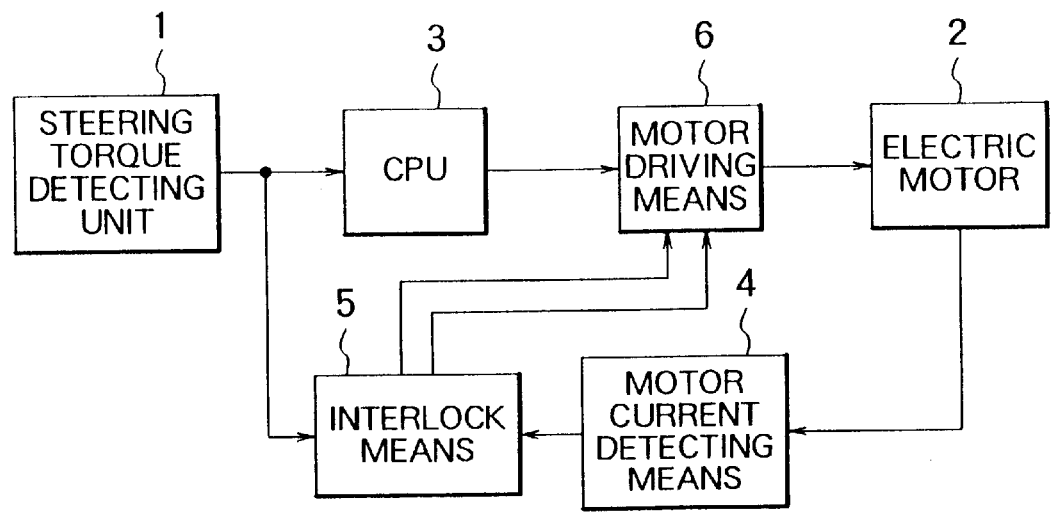
FIG. 1 is a schematic block diagram showing generally a configuration of a motor-driven power steering system according to an embodiment of the present invention.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "clockwise", "counterclockwise", and the like are words of convenience and are not to be construed as limiting terms.

Embodiment 1

FIG. 1 is a schematic block diagram showing generally a configuration of the motor-driven power steering system according to an embodiment of the present invention. As can be seen in FIG. 1, the motor-driven power steering system is comprised of a steering torque detecting unit 1 for detecting a steering torque applied by a driver, an electric motor 2 for generating an assist torque for aiding the driver in his or her manipulation of a steering wheel, a CPU (central processing unit) 3 realized by a microcomputer, microprocessor or the like for controlling the motor 2 in accordance with the output of the steering torque detecting unit 1, a motor current detecting means 4 for measuring a motor current flowing through the electric motor 2, and an interlock means 5 for enabling or inhibiting (disabling) a driving direction of the motor in dependence on the output of the steering torque detecting unit 1, wherein the range in which the driving direction of the motor 2 is inhibited is changed or modified in dependence on the detected value of the motor current.

Further, the motor-driven power steering system includes a motor driving means 6 for allowing the motor 2 to be driven in the driving direction enabled by the interlock means 5 in accordance with the output signal of the CPU 3 while inhibiting or disabling the driving operation of the motor 2 in the direction inhibited by the interlock means 5.

Figure 2:
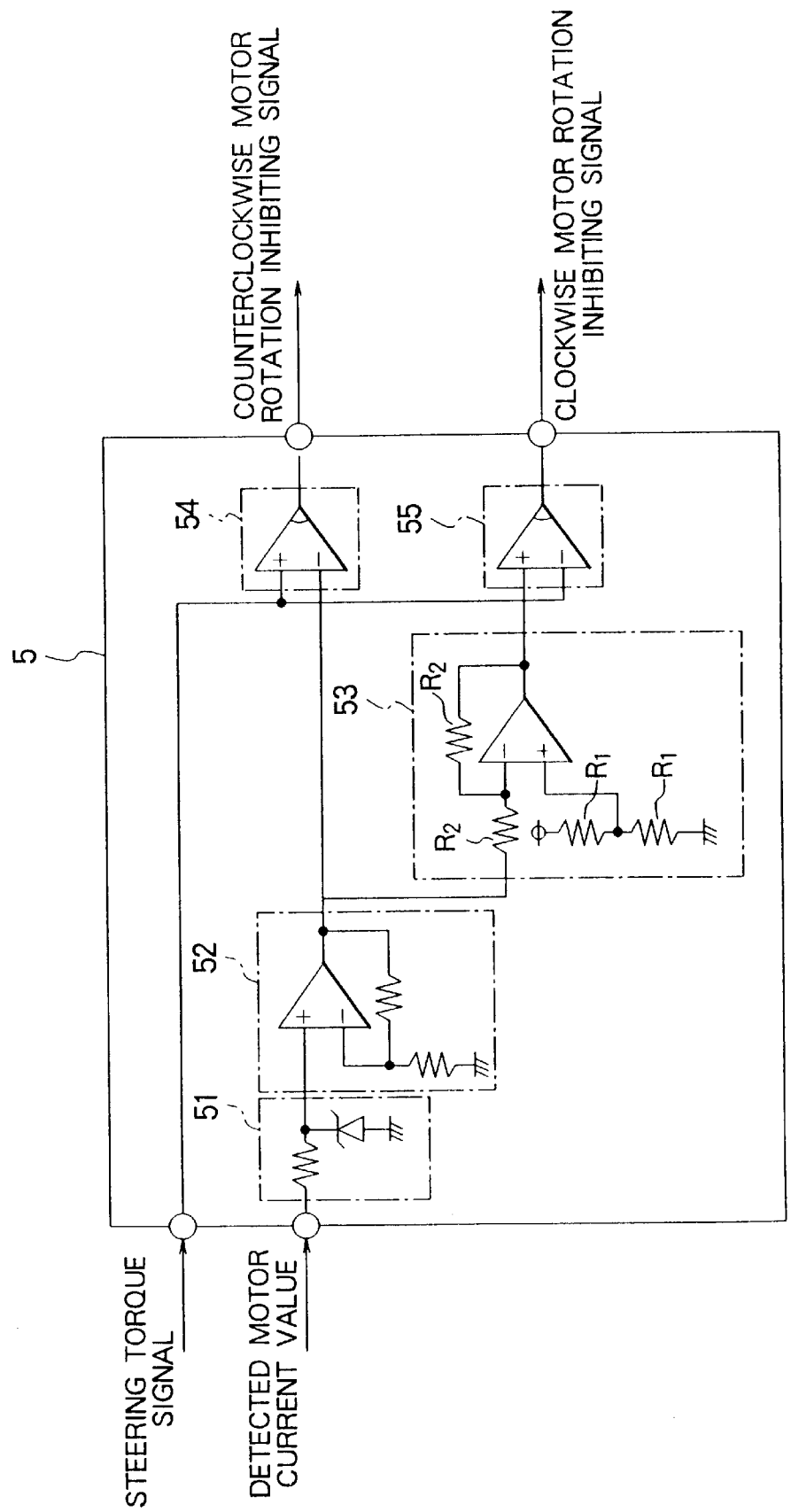
FIG. 2 is a circuit diagram showing in detail a structure of an interlock means according to a first embodiment of the present invention.

FIG. 2 is a circuit diagram showing in detail a structure of the interlock means 5 according to a first embodiment of the present invention. As can be seen in the figure, the interlock means 5 is constituted by a limiter circuit 51 for defining an upper limit of the detected value of the motor current as inputted, a non-inverting amplifier circuit 52 for amplifying the signal representing the detected value of the motor current without inverting the polarity, an inverting amplifier circuit 53 for amplifying the output of the non-inverting amplifier circuit 52 with polarity inversion, and an inhibiting signal generating circuit 55 which assumes a high impedance state (H) indicating "enable" when the steering torque signal is higher than the output signals of the amplifier circuits 52 and 53 while assuming a low impedance state (L) indicating "inhibit" when the outputs of the amplifier circuits 52 and 53 is higher than the steering torque signal.

Next, description will be directed to operation of the motor-driven power steering system according to the instant embodiment of the invention.

Figure 3:
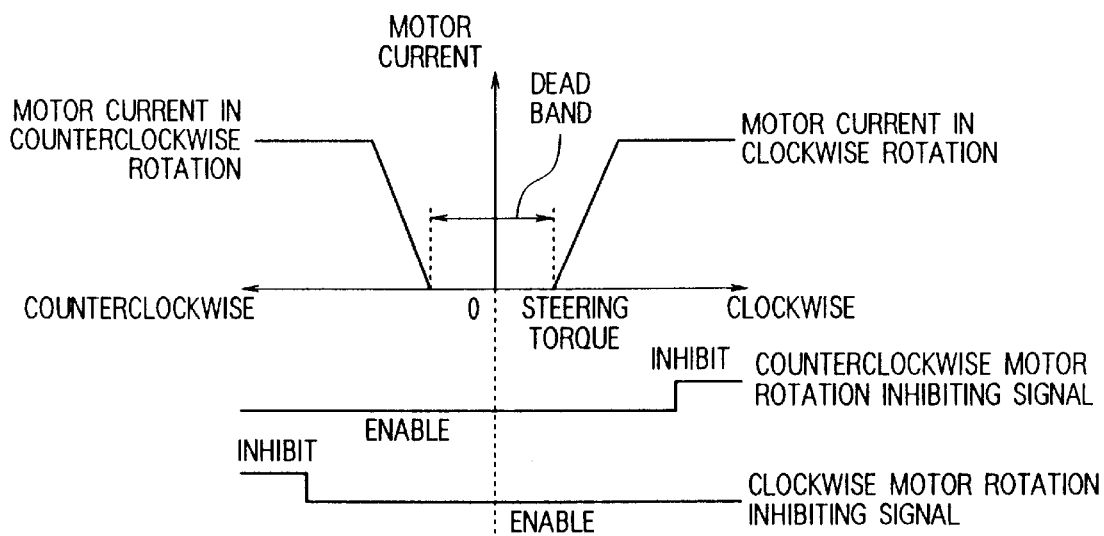
FIG. 3 is a view for graphically illustrating relation between a steering torque and a motor current together with inhibiting regions of the interlock means when the motor current is zero.
Figure 4:
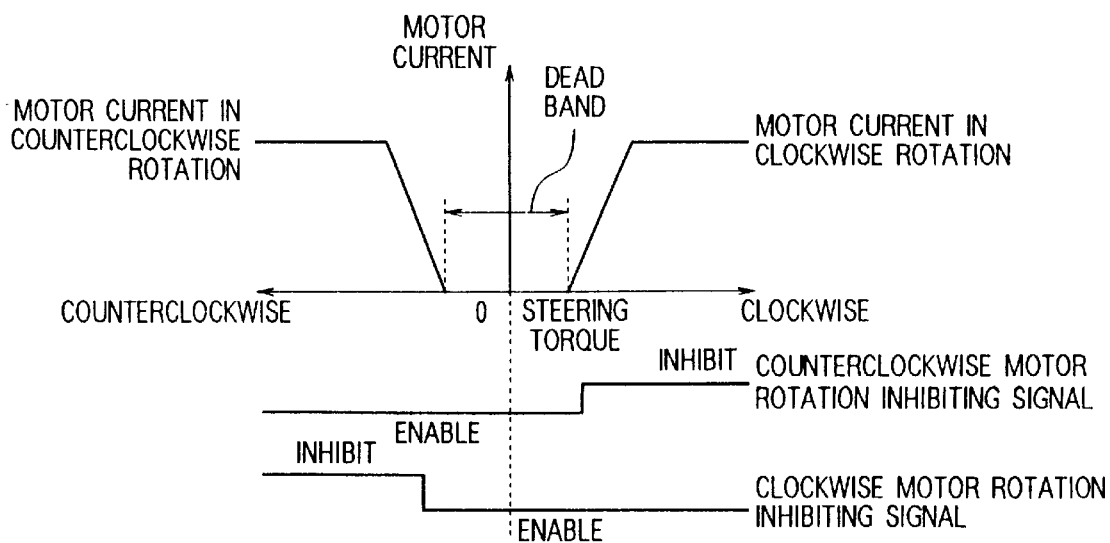
FIG. 4 is a view for graphically illustrating relation between the steering torque and the motor current together with inhibiting regions of the interlock means when the motor current is small.
Figure 5:
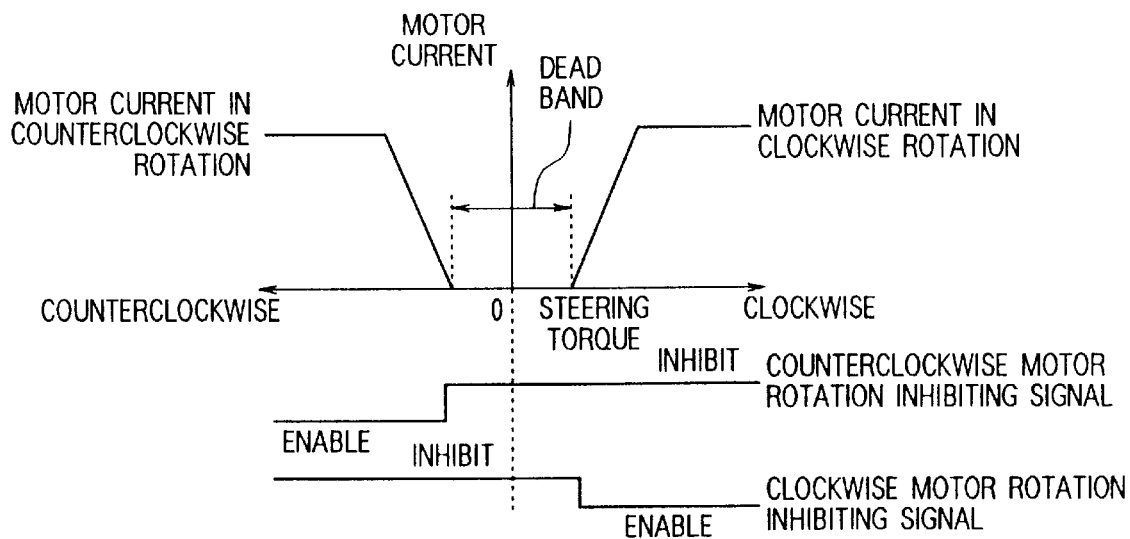
FIG. 5 is a view for graphically illustrating relation between the steering torque and the motor current together with inhibiting regions of the interlock means when the motor current is large.

When the motor current is small, the output of the non-inverting amplifier circuit 52 is at a low level while that of the inverting amplifier circuit 53 is high. Consequently, the inhibiting region of the interlock means 5 is such as illustrated in FIG. 3. As the motor current increases, the output of the non-inverting amplifier circuit 52 becomes high while that of the inverting amplifier circuit 53 becoming low. As a result of this, the inhibiting region of the interlock means 5 is broadened, as illustrated in FIGS. 4 and 5. However, because the upper limit of the detected value of the motor current inputted to the non-inverting amplifier circuit 52 is limited by the limiter circuit 51, the inhibiting region of the interlock means 5 can not increase beyond the range shown in FIG. 5.

Now, let's assume that a driver turns slowly the steering wheel in one direction from the neutral point. In that case, when the steering direction coincides with the driving direction of the motor 2, then the motor-driven power steering system operates in a manner mentioned below.

So long as the motor current is small, the inhibiting region of the interlock means 5 is narrow, as illustrated in FIG. 3. Consequently, the interlock means 5 outputs no inhibiting signal in any driving direction of the motor 2. As the motor current increases as a function of the steering torque, the inhibiting region of the interlock means 5 becomes broader, as can be seen in FIGS. 4 and 5. However, when the inhibiting region of the interlock means 5 increases, this means that the steering torque increases as well. Consequently, the driving operation of the motor 2 is never disabled by the interlock means 5.

When the motor 2 is driven in the state where the steering torque lies within the dead band in order to perform the control for turning back the steering wheel to the center or neutral point, the inhibiting region of the interlock means 5 which depends on the motor current is such as shown in FIG. 4. However, in the dead band, no inhibiting signal is outputted in any driving direction of the motor 2. In other words, the driving operation of the motor 2 is not disabled by the interlock means 5.

Furthermore, when the motor driving signal of magnitude which allows self-rotation of the steering wheel is continuously outputted regardless of the steering torque due to occurrence of abnormality in the CPU 3, the inhibiting region of the interlock means 5 is such as shown in FIG. 5. In the following, three operation modes of the motor-driven power steering system which depend on different steering states will be elucidated.

a) When the driver is manipulating the steering wheel with his or her hands and when the steering direction coincides with the driving direction of the motor 2, the driving operation of the motor 2 is never disabled by the interlock means 5. Thus, the steering operation is aided by the assist torque applied by the motor 2.

b) By contrast, when the driver manipulates the steering wheel and when the direction of the steering torque does not coincide with that of the driving direction of the motor 2, the driving operation of the motor 2 is immediately disabled or inhibited by the interlock means 5. When the driving operation of the motor 2 is disabled, the motor current decreases with the inhibiting region of the interlock means 5 becoming narrow. Accordingly, the motor 2 is again put into driving operation, and the motor current increases. However, because the inhibiting region of the interlock means 5 is again enlarged, the driving operation of the motor 2 is again inhibited. In this way, the driving operation of the motor 2 is limited to such that extent which allows the manual steering to be performed.

c) When the steering torque lies within the dead band with the driver releasing the steering wheel, the driving operation of the motor 2 is immediately disabled or inhibited by the interlock means 5. When the driving operation of the motor 2 is disabled, the motor current decreases with the inhibiting region of the interlock means 5 becoming narrow. Accordingly, the motor 2 is again put into driving operation, and the motor current increases. However, because the inhibiting region of the interlock means 5 is again enlarged, the driving operation of the motor 2 is again inhibited. Thus, such an undesirable situation as a self-rotation of the steering wheel can be prevented because of limitation of the driving operation of the motor 2.

As is apparent from the foregoing, it is possible to drive the motor 2 even within the dead band. Thus, the comfortableness of the steering operation can be enhanced. Besides, the possibility of the motor 2 being driven in the direction opposite to the steering direction due to occurrence of abnormality in the CPU 3 as well as self-rotation of the steering wheel in the released state can positively be excluded. Additionally, because these advantageous features can be realized by a simplified circuit structure designed for changing the inhibiting region of the interlock means 5, the motor-driven power steering system can be implemented inexpensively in a simplified structure when compared with the conventional system described hereinbefore.

Embodiment 2

Figure 6:
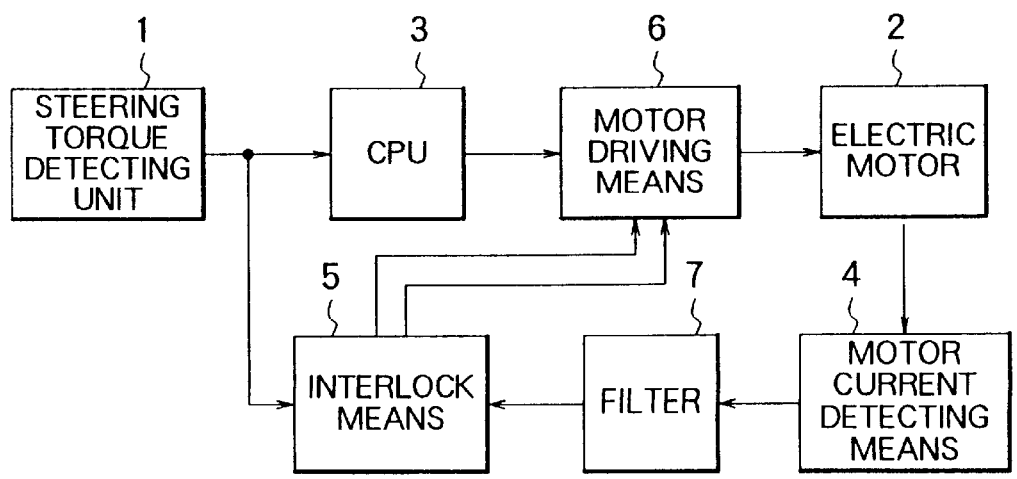
FIG. 6 is a schematic block diagram showing generally a configuration of the motor-driven power steering system according to a second embodiment of the present invention.
Figure 7:
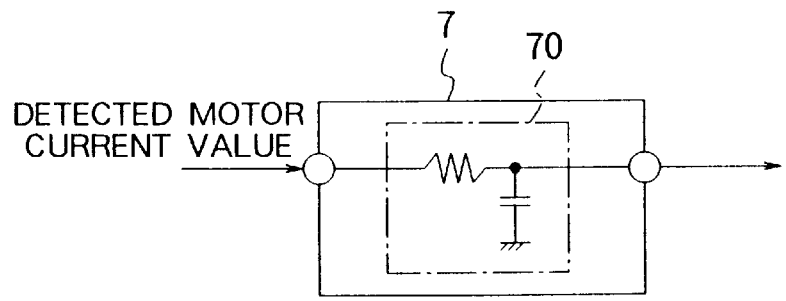
FIG. 7 is a circuit diagram showing in detail a structure of a filter employed in the system according to the second embodiment of the invention.

In the motor-driven power steering system according to the first embodiment of the invention, the detected value signal of the motor current is inputted directly to the interlock means 5, as shown in FIG. 6. However, the detected motor current signal may preferably be inputted to the interlock means 5 after having undergone filtering processing by a filter 7. FIG. 7 is a schematic circuit diagram of the filter 7 which is implemented in the form of a low-pass filter 70. By eliminating high-frequency noise components from the signal representing the detected value of the motor current by the low-pass filter 70, the inhibiting region of the interlock means 5 can be protected against erroneous change due to the noise components which may possibly be contained in the motor current detected value. At this juncture, it should also be mentioned that when the rotating direction of the motor 2 rotating at a high speed is changed over, a current proportional to the angular velocity of the motor 2 may be caused to flow temporarily in the direction to which the rotating direction of the motor 2 is to be changed over for the purpose of compensating for a delay in response as brought about by inertia of the motor 2. In that case, by employing the low-pass filter 70 as mentioned above, the inhibiting region of the interlock means 5 can be extended with a delay to thereby protect the driving operation of the motor 2 from being inhibited or disabled by the interlock means 5.

Embodiment 3

Figure 8:
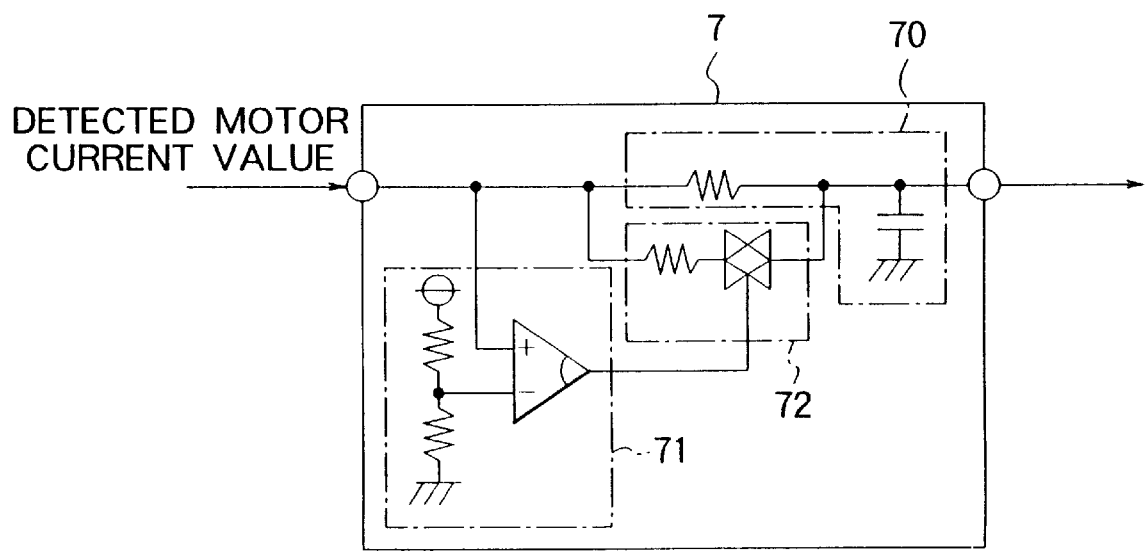
FIG. 8 is a circuit diagram showing in detail a structure of a filter according to a third embodiment of the invention.

FIG. 8 is a schematic circuit diagram showing a filter circuit including the low-pass filter 70 mentioned above, wherein the time constant of the low-pass filter 70 is adapted to be changed in accordance with the detected value of the motor current according to the teaching of the invention incarnated in a third embodiment thereof. Referring to the figure, the detected value of the motor current is compared with a predetermined value by a comparator 71. When the detected value is greater than the predetermined value, the time constant of the low-pass filter 70 is decreased by a time constant change-over circuit 72. On the other hand, when the predetermined value is smaller than the motor current detected value, the time constant of the low-pass filter 70 is increased by the time constant change-over circuit 72. Thus, when the motor current is small, advantageous effect equivalent to that mentioned above in conjunction with the second embodiment can be obtained. On the other hand, when the motor current is large, the inhibiting region of the interlock means 5 is changed with less delay, whereby the driving operation of the motor 2 can instantaneously be disabled upon occurrence of abnormality in the CPU 3.

Embodiment 4

Figure 9:
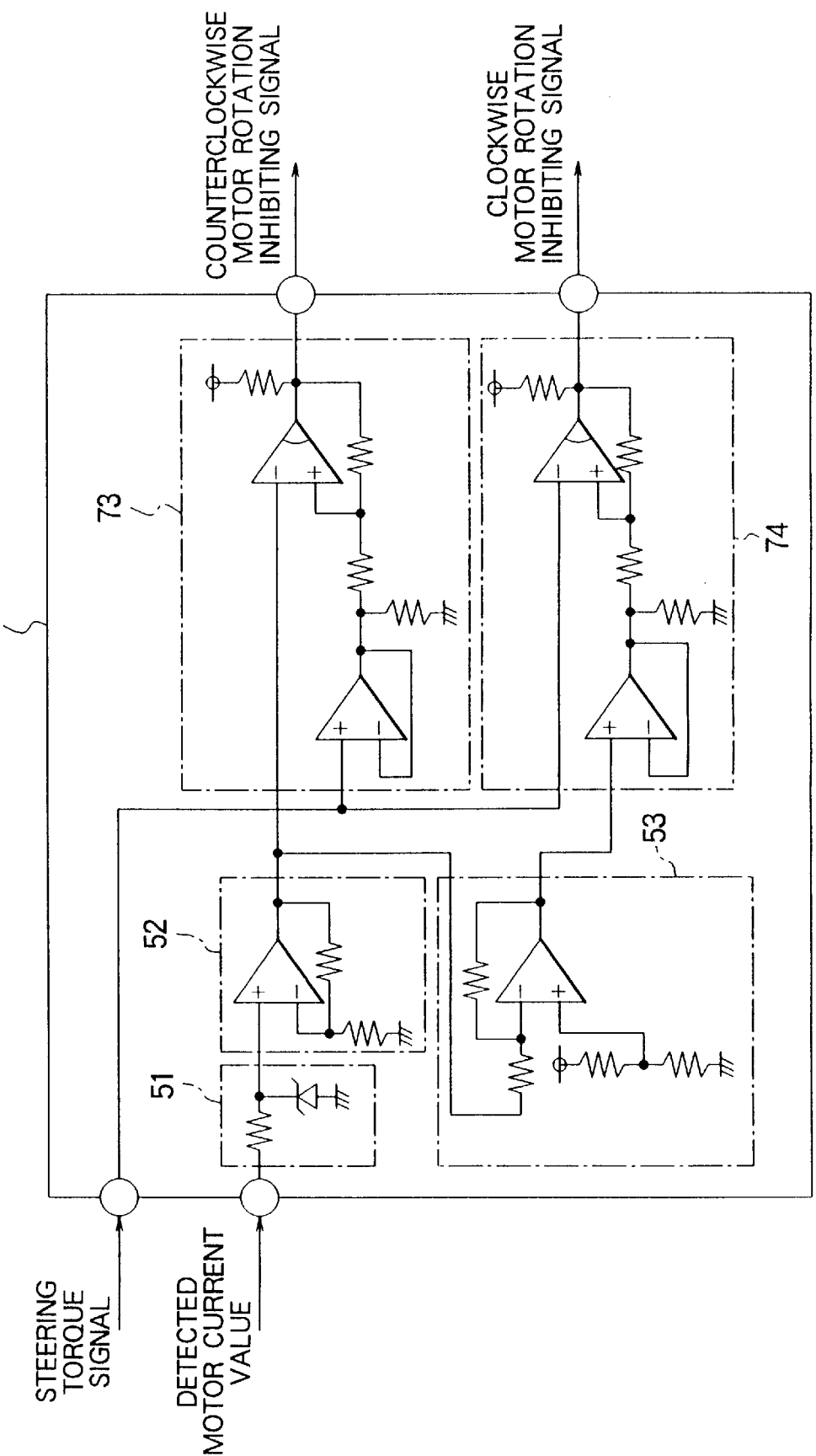
FIG. 9 is a circuit diagram showing in detail a structure of an interlock means according to a fourth embodiment of the present invention.

FIG. 9 is a circuit diagram showing a structure of the interlock means 5 according to a fourth embodiment of the invention. Referring to the figure, inhibiting signal generating circuits 73 and 74 with hysteresis are employed in place of the inhibiting signal generating circuits 54 and 55 in the system according to the first embodiment. The inhibiting signal generating circuits 73 and 74 with hysteresis compare the outputs of the amplifier circuits 52 and 53 with the steering torque signal with hysteresis to output a signal H indicating "enabling" when the steering torque is greater than the output of the amplifier circuit 52, 53 while outputting a signal L indicating "inhibiting" when the output of the amplifier circuit is greater than the steering torque signal. Thus, the circuit configuration according to the fourth embodiment of the invention is advantageous in that so-called chattering phenomenon can be suppressed from occurring when the signal inhibiting the driving direction of the motor 2 is changed over to the enabling signal or vise versa.

Embodiment 5

Figure 10:
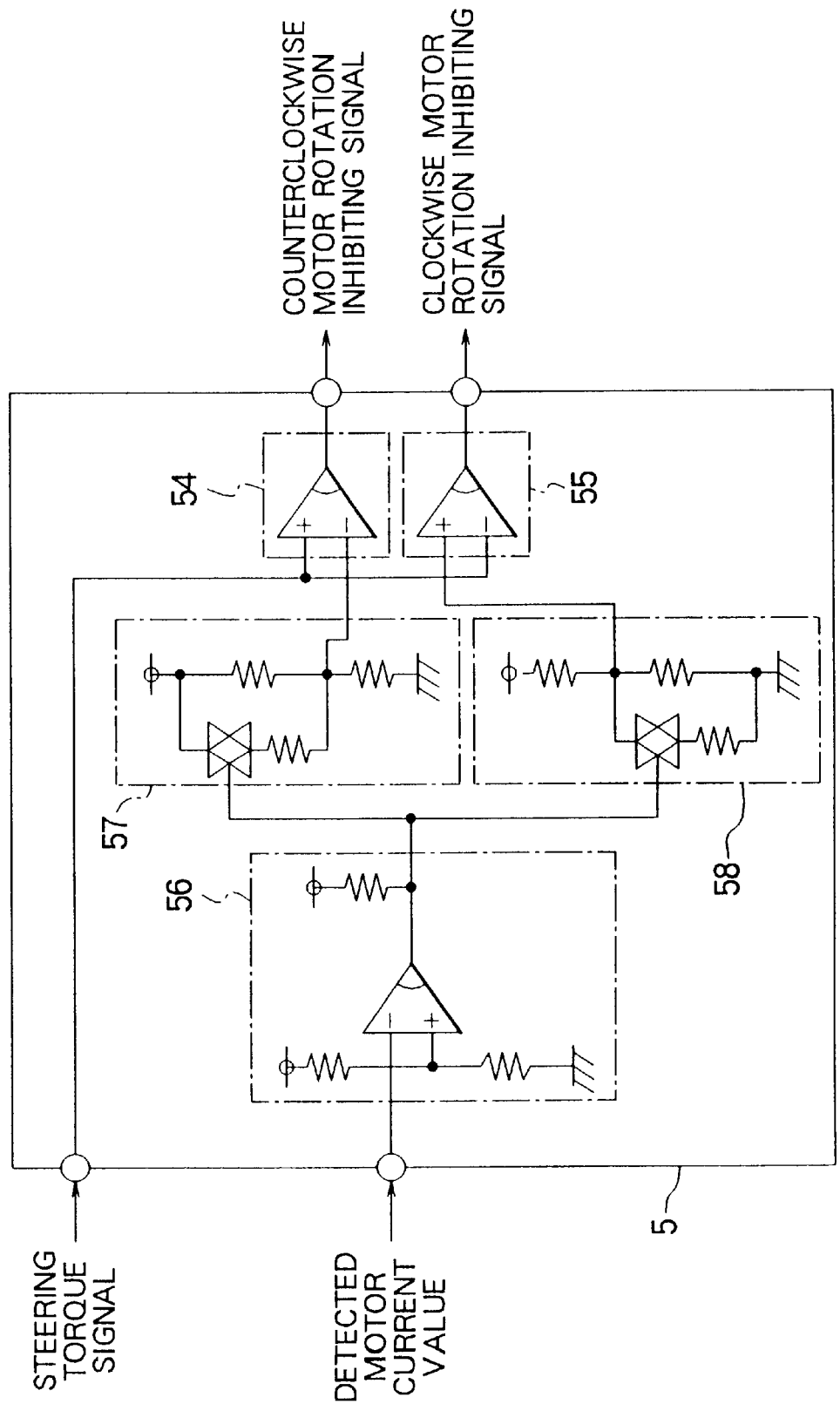
FIG. 10 is a circuit diagram showing in detail a structure of an interlock means according to a fifth embodiment of the present invention.

In the case of the motor-driven power steering systems according to the first to fourth embodiments, the inhibiting region of the interlock means 5 is changed continuously. According to the invention incarnated in a fifth embodiment, the inhibiting region of the interlock means 5 is changed stepwise in dependence on the detected values of the motor current. FIG. 10 is a circuit diagram showing a structure of the interlock means 5 according to the fifth embodiment of the invention. As can be seen in FIG. 10, the interlock means 5 includes a comparator 56 for making decision concerning magnitude of the detected value of the motor current, and resistance-type voltage dividers 57 and 58 which respond to the output of the comparator 51 for turning on/off analogue switches incorporated in the resistance-type voltage dividers 57 and 58 to thereby change the output voltage thereof.

When it is detected by the comparator 56 that the detected value of the motor current is smaller than a predetermined value preset at the comparator 56, the output thereof assumes a level H to thereby turn on the analogue switches of the resistance-type voltage dividers 57 and 58. Consequently, the output voltage of the resistance-type voltage divider 57 becomes high, as a result of which the inhibiting region for the counterclockwise rotation becomes narrower. On the other hand, the output voltage of the resistance-type voltage divider 58 becomes lower, whereby the inhibiting region for the clockwise rotation becomes narrower.

By contrast, when the detected value of the motor current is greater than a predetermined value set at the comparator 56, the output thereof assumes a level L to thereby turn off the analogue switches of the resistance-type voltage dividers 57 and 58. Consequently, the output voltage of the resistance-type voltage divider 57 becomes low, as a result of which the inhibiting region for the counterclockwise rotation becomes broader. On the other hand, the output voltage of the resistance-type voltage divider 58 becomes high, whereby the inhibiting region for the clockwise rotation becomes broader.

By changing stepwise the inhibiting region of the interlock means 5 as mentioned above, there can be obtained not only the advantageous effects similar to those mentioned previously in conjunction with the first to fourth embodiment but also additional advantage that the circuit configuration can be simplified.

Embodiment 6

Figure 11:
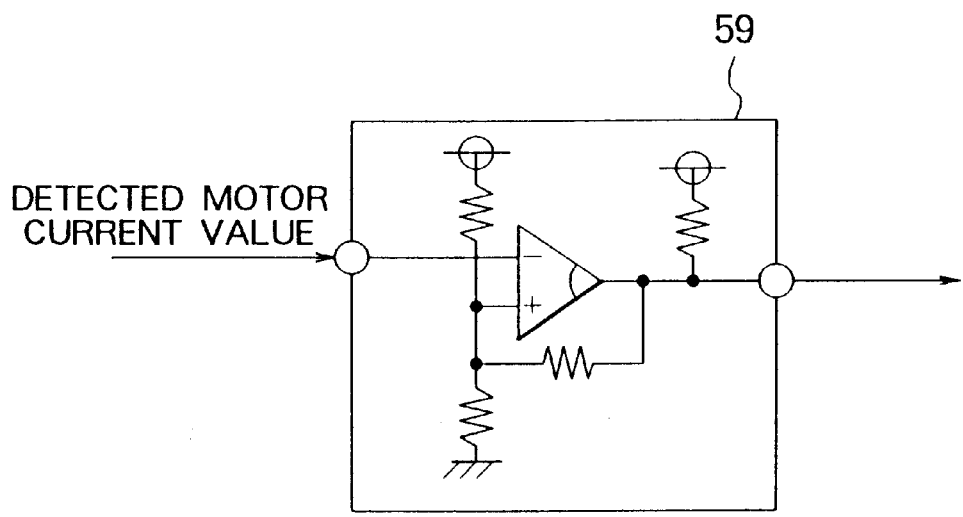
FIG. 11 is a circuit diagram showing in detail a structure of a hysteresis comparator according to a sixth embodiment of the present invention.

FIG. 11 is a schematic circuit diagram showing a hysteresis comparator employed in the interlock means 5 according to a sixth embodiment of the present invention. The interlock means 5 according to the sixth embodiment differs from that of the fifth embodiment in that a hysteresis comparator 59 is employed in place of the comparator 56 mentioned previously. By using the hysteresis comparator 59, the chattering phenomenon can be suppressed when the inhibiting region of the interlock means 5 is changed or modified. In this conjunction, it is also to be mentioned that an excessively large current of the motor 2 is suppressed by increasing/decreasing the inhibiting region of the interlock means 5. By using the hysteresis comparator 59, the motor current which increases or enlarges the inhibiting region of the interlock means 5 can be set to be smaller than the motor current which narrows the inhibiting region of the interlock means 5. Thus, the motor current to be suppressed is smaller than that processed in the apparatus according to the fifth embodiment.

Embodiment 7

Figure 12:
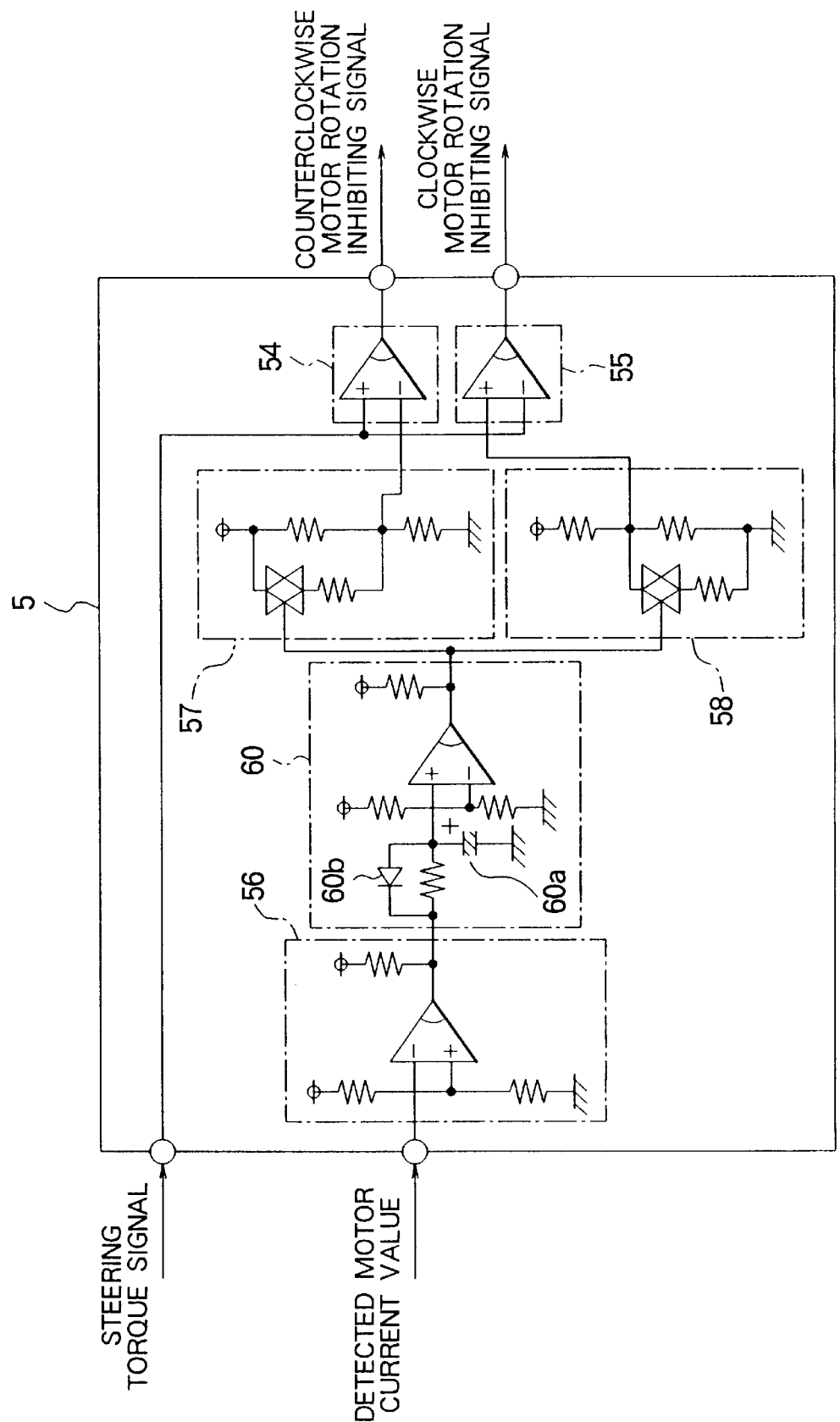
FIG. 12 is a circuit diagram showing in detail a structure of an interlock means according to a seventh embodiment of the present invention.

In the case of the interlock means 5 according to the fifth embodiment described above, the output of the comparator 56 is inputted to the resistance-type voltage dividers 57 and 58. In the interlock means 5 according to a seventh embodiment of the invention, a timer circuit 60 is interposed between the comparator 56 and the resistance-type voltage dividers 57 and 58, as shown in FIG. 12.

Referring to the figure, when a potential at a capacitor 60a rises beyond a predetermined value in response to the output of level H of the comparator 56, the timer circuit 60 outputs a signal of level H. On the other hand, when the output of the comparator 56 is of a level L, electric charge of the capacitor 60a is discharged through a diode 60b. When the potential at the capacitor 60a lowers below the predetermined value, the timer circuit 60 outputs the level L. Because the time constant at which the capacitor 60a is charged is greater than the time constant at which the capacitor 60a is charged, the timer circuit 60 operates as a timer for measuring a time for which the comparator 56 continues to output the level H.

By employing the timer circuit 60 in this way, it is possible to prevent the inhibiting region of the interlock means 5 from being increased for the temporarily or transiently increased motor current. To say in another way, the inhibiting region of the interlock means 5 can be protected against being enlarged due to high-frequency noise possibly superposed on the motor current as detected. Besides, the control for changing over the rotating direction of the motor 2 as described hereinbefore in conjunction with the second embodiment can be performed without being inhibited by the interlock means 5.

Incidentally, the hysteresis comparator 59 mentioned previously in conjunction with the sixth embodiment may be employed in place of the comparator 56.

Embodiment 8

Figure 13:
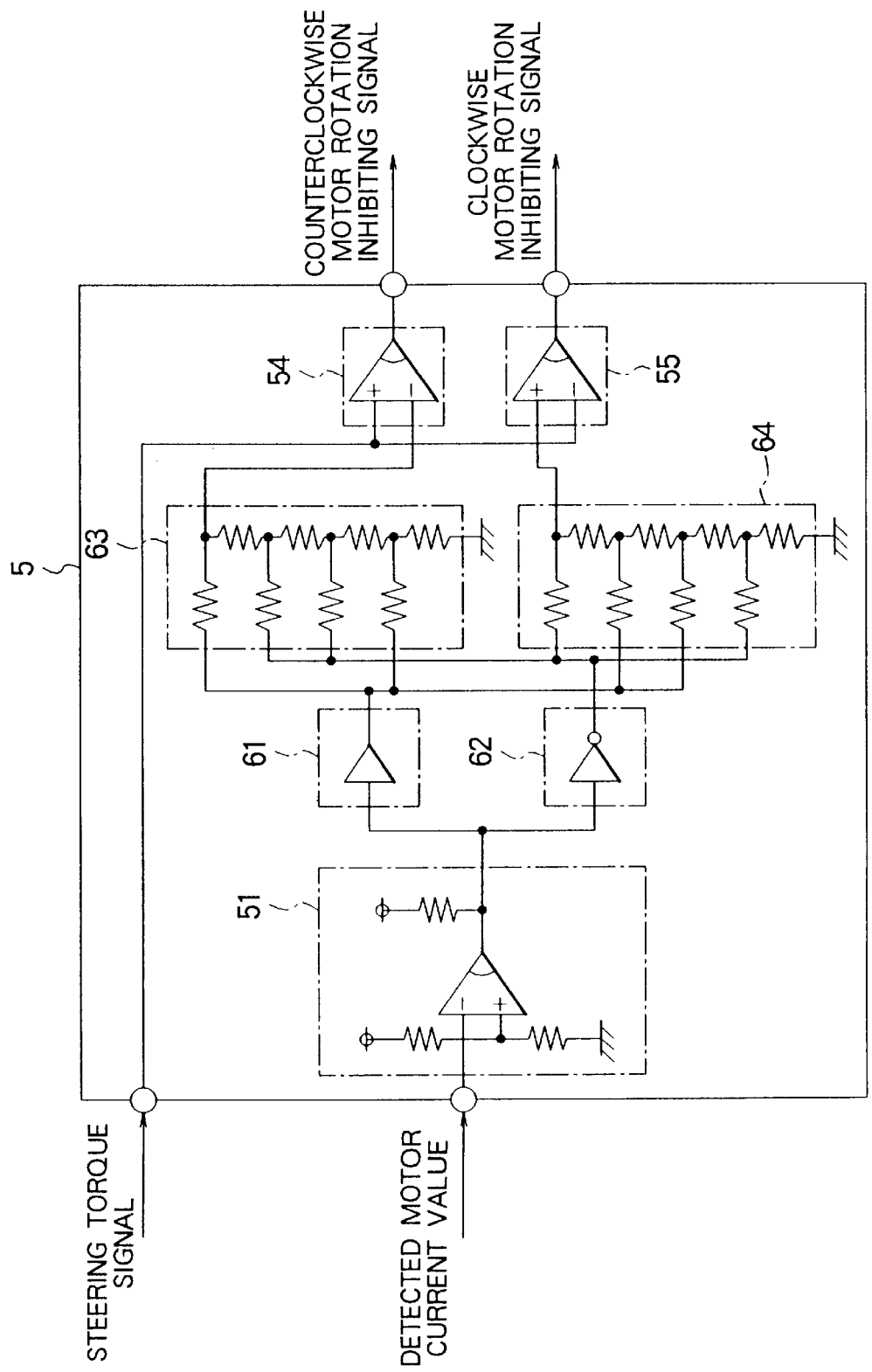
FIG. 13 is a circuit diagram showing in detail a structure of an interlock means according to an eighth embodiment of the present invention.

In the case of the fifth to seventh embodiments of the invention described above, analogue switches are employed in the amplifier circuits 52 and 53 constituting parts of the interlock means 5. However, ladder resistor circuits may be employed substantially to the same effects. FIG. 13 is a circuit diagram showing a structure of the interlock means 5 according to an eighth embodiment of the invention. Referring to the figure, the interlock means 5 according to the instant embodiment includes a buffer 61, an inverter 62, a ladder resistor circuit 63 for determining or defining an inhibiting region for the motor rotation in the counterclockwise direction and a ladder resistor circuit 64 for defining an inhibiting region for the motor rotation in the clockwise direction.

By inputting to the ladder resistor circuits 63 and 64 the output of the buffer 61 or the inverter 62 which can be changed over in dependence on the output of the limiter circuit 51, it is possible to change the inhibiting region of the interlock means 5.

With the arrangement mentioned above, the motor-driven power steering system comparable to those described previously in conjunction with the fifth to seventh embodiments can be realized more inexpensively.

Embodiment 9

Figure 14:
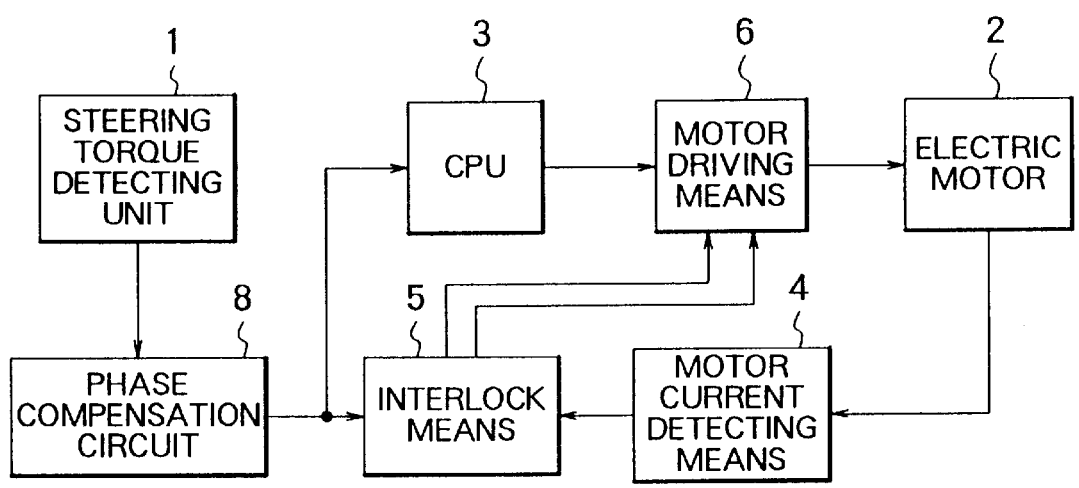
FIG. 14 is a circuit diagram showing in detail a structure of an interlock means according to a ninth embodiment of the present invention.

In the motor-driven power steering system according to the first to eighth embodiments of the invention, the output of the steering torque detecting unit 1 is inputted to the interlock means 5. However, in the motor-driven power steering system in which the steering torque signal is inputted by way of the phase compensation circuit 8, the output of the phase compensation circuit 8 may be inputted to the interlock means 5, as shown in FIG. 14.

By virtue of the arrangement mentioned above, the motor-driven power steering system enjoying high reliability can be realized because the steering torque signal used for the control by the CPU 3 is inputted to the interlock means 5.

Embodiment 10

Figure 15:
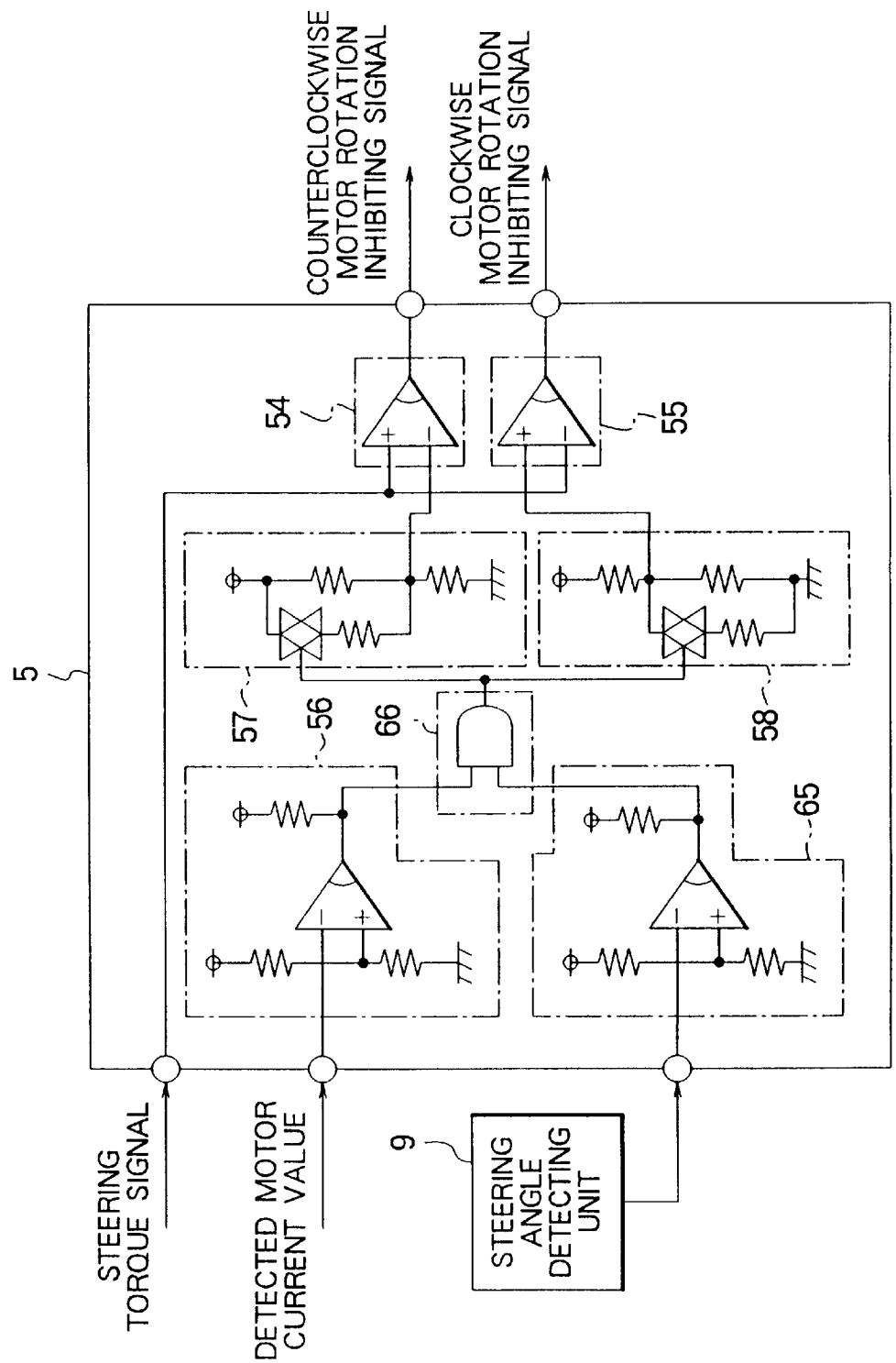
FIG. 15 is a circuit diagram showing in detail a structure of an interlock means according to a tenth embodiment of the present invention.

In the motor-driven power steering systems according to the first to ninth embodiments, the inhibiting region of the interlock means 5 is changed in dependence on magnitude of the detected value of the motor current. However, such arrangement may be adopted in which a steering angle detector is provided for detecting the steering angle and in which the inhibiting region of the interlock means 5 is increased when the detected steering angle is large. The tenth embodiment of the invention is directed to this arrangement. Referring to FIG. 15, the interlock means 5 according to the instant embodiment includes a steering angle detecting unit 9 whose output voltage becomes high as the steering angle of a steering shaft increases and a comparator 65 for comparing the output of the steering angle detecting unit 9 with a predetermined value, wherein when the output of the steering angle detecting unit 9 exceeds the predetermined value, the comparator 65 outputs a signal L (level L) and, if otherwise, a signal H. The outputs of the comparators 65 and 56 are logically ANDed, the result of which is inputted to the resistance-type voltage dividers 57 and 58, whereby the inhibiting region of the interlock means 5 is enlarged when either one of the outputs of the comparator 65 and the comparator 56 is "L".

By virtue of the structure of the interlock means 5 described above, safety can be secured equally in the case where the steering wheel is manipulated with a large steering angle.

Parenthetically, rotation angle of the motor 2 may be utilized instead of the steering angle of the steering shaft substantially to the same effect.

Embodiment 11

Figure 16:
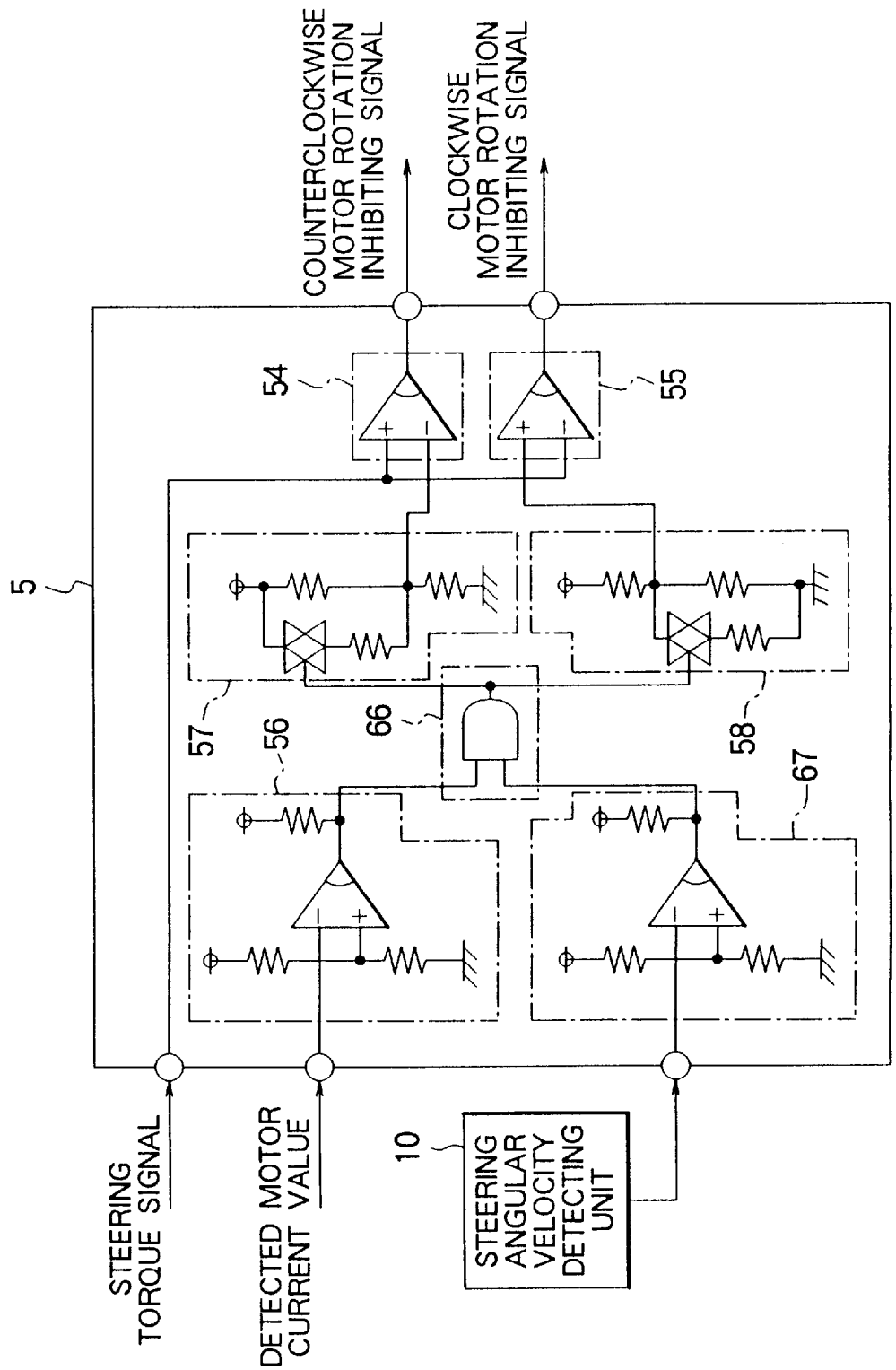
FIG. 16 is a circuit diagram showing in detail a structure of an interlock means according to an eleventh embodiment of the present invention.

In the motor-driven power steering systems according to the first to tenth embodiments, the inhibiting region of the interlock means 5 is changed in dependence on magnitude of the detected value of the motor current. However, such arrangement may be adopted in which a steering angular velocity detecting unit is provided for detecting the steering angular velocity and in which the inhibiting region of the interlock means 5 is increased when the detected steering angular velocity is high. An eleventh embodiment of the invention is directed to this arrangement. Referring to FIG. 16, the interlock means 5 according to the instant embodiment includes a steering angular velocity detecting unit 10 whose output voltage becomes high as the steering angular velocity of the steering shaft increases, and a comparator 67 for comparing the output of the steering angular velocity detecting unit 10 with a predetermined value, wherein when the output of the steering angular velocity detecting unit 10 exceeds the predetermined value, the comparator 67 outputs a signal L (level L) and, if otherwise, a signal H. The outputs of the comparators 67 and 56 are logically ANDed, the result of which is inputted to the resistance-type voltage dividers 57 and 58, whereby the inhibiting region of the interlock means 5 is enlarged when either one of the outputs of the comparator 67 and the comparator 56 is "L".

By virtue of the structure of the interlock means 5 described above, safety can be secured equally in the case where the steering wheel is manipulated at a high steering angular velocity.

Parenthetically, angular velocity of the motor 2 may be utilized instead of the steering angular velocity of the steering shaft substantially to the same effect.

Embodiment 12

Figure 17:
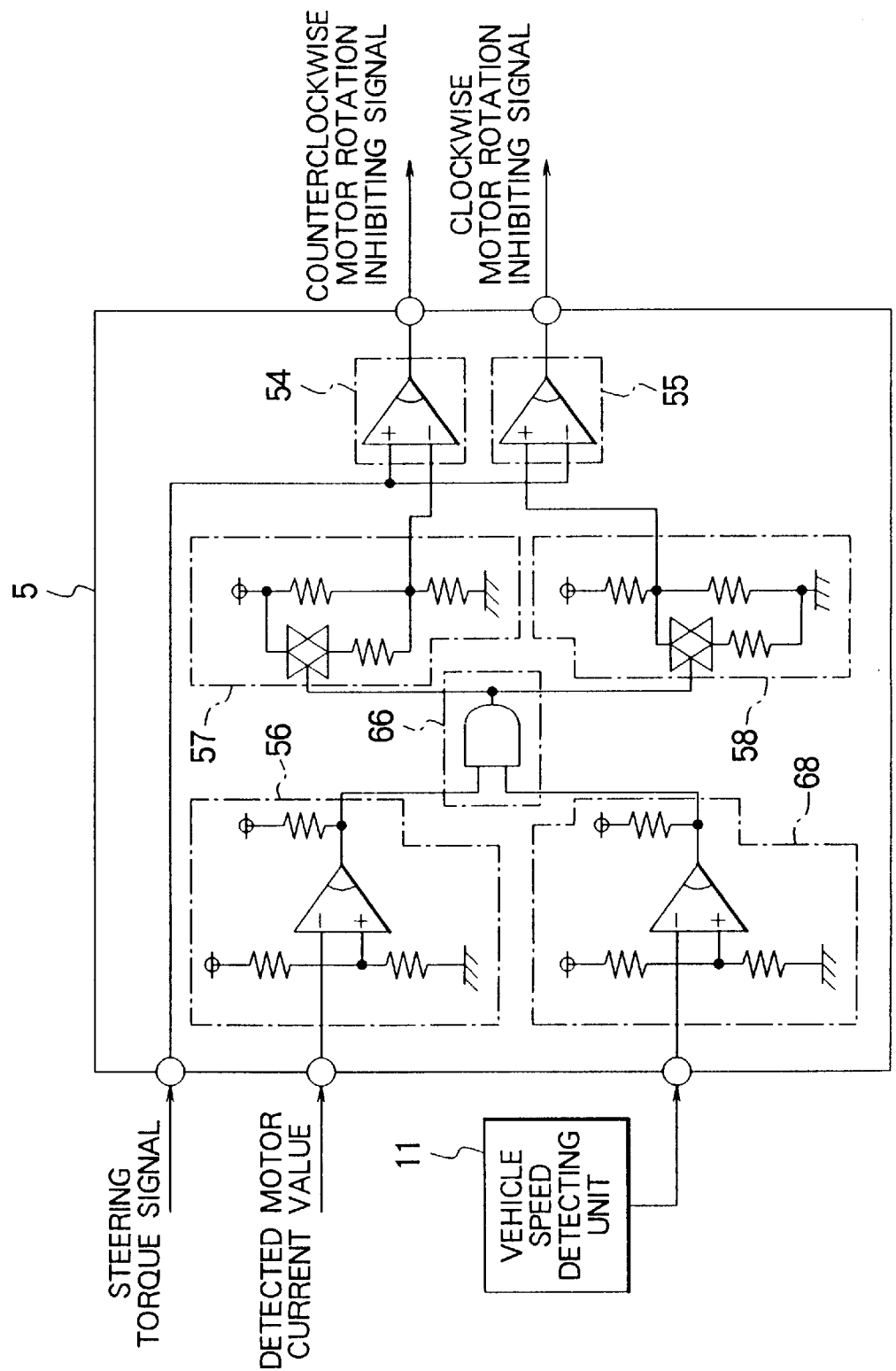
FIG. 17 is a circuit diagram showing in detail a structure of an interlock means according to a twelfth embodiment of the present invention.

In the motor-driven power steering systems according to the first to eleventh embodiments, the inhibiting region of the interlock means 5 is changed in dependence on magnitude of the detected value of the motor current. However, such arrangement may equally be adopted in which a vehicle speed detecting unit is employed for detecting the speed of the motor vehicle, wherein the inhibiting region of the interlock means 5 is increased when the detected vehicle speed is high. A twelfth embodiment of the invention is directed to this arrangement. Referring to FIG. 17, the interlock means 5 according to the instant embodiment includes a vehicle speed detecting unit 11 whose output voltage becomes high as the vehicle speed increases, and a comparator 68 for comparing the output of the vehicle speed detecting unit 11 with a predetermined value, wherein when the output of the vehicle speed detecting unit 11 exceeds the predetermined value, the comparator 68 outputs a signal L and, if otherwise, a signal H. The outputs of the comparators 68 and 56 are logically ANDed, the result of which is inputted to the resistance-type voltage dividers 57 and 58, whereby the inhibiting region of the interlock means 5 is enlarged when either one of the outputs of the comparator 68 and the comparator 56 is "L".

By virtue of the structure of the interlock means 5 described above, safety can be secured equally even when the motor vehicle is running at a high speed.

Embodiment 13

Figure 18:
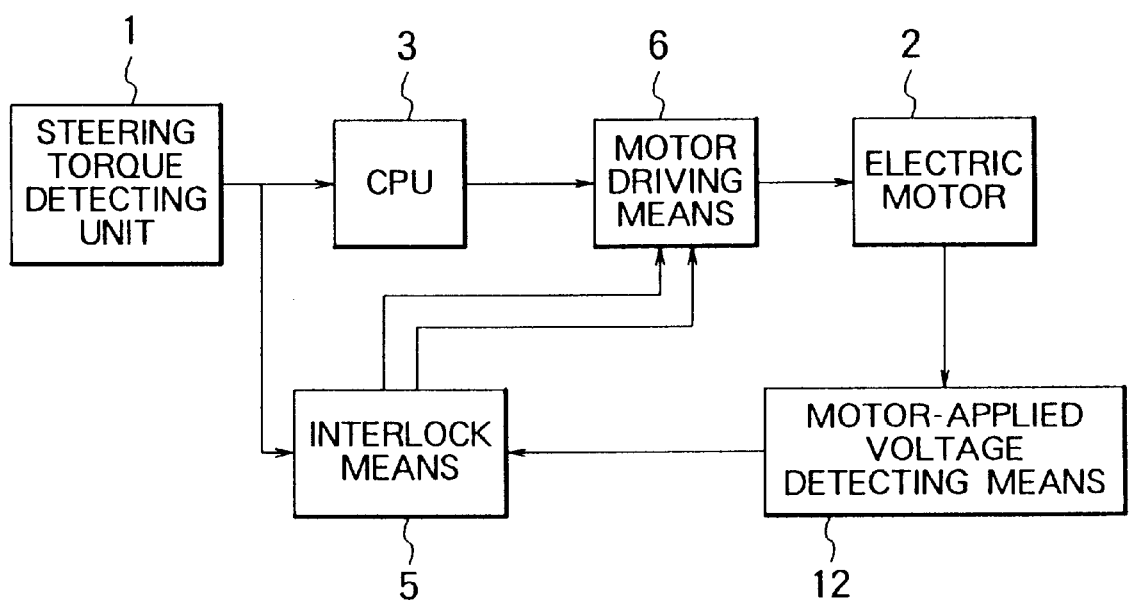
FIG. 18 is a circuit diagram showing in detail a structure of an interlock means according to a thirteenth embodiment of the present invention.

In the motor-driven power steering systems according to the first to twelfth embodiments of the invention, the inhibiting region of the interlock means 5 is changed or modified in dependence on magnitude of detected motor current. However, it is equally possible to adopt such arrangement that a motor-applied voltage detecting means 12 is provided to change the inhibiting region of the interlock means 5 in dependence on the detected value of the voltage applied to the motor 2, as shown in FIG. 18.

Many modifications and variations of the present invention are possible in the light of the above techniques. It is therefore to be understood that within the scope of the appended claims, the invention may be practiced otherwise than as specifically described.

What is claimed is:

1. A motor-driven power steering system for a motor vehicle, comprising:

steering torque detecting means for detecting a steering torque applied to a steering wheel by a driver;

an electric motor for applying an assist torque to a steering mechanism for thereby assisting the driver in steering operation;

control means for outputting a motor driving signal for driving said motor in dependence on the output of said steering torque detecting means;

interlock means for enabling or inhibiting a driving direction of said motor in dependence on the output of said steering torque detecting means;

motor driving means for driving said motor in the direction enabled by said interlock means in accordance with said motor driving signal while disabling driving operation of said motor in a direction inhibited by said interlock means; and motor current detecting means for measuring a current flowing through said electric motor, wherein a threshold value referenced by said interlock means in decision for enabling or inhibiting the driving direction of said motor is changed in accordance with said detected value of said motor current.

2. A motor-driven power steering system according to claim 1, further comprising:

filtering means for changing temporally the detected value of the motor current, wherein the threshold value referenced by said interlock means in the decision for enabling or inhibiting the driving direction of said motor is changed in accordance with output of said filtering means.

3. A motor-driven power steering system according to claim 2, wherein characteristic of said filtering means is changed in dependence on the detected value of said motor current.

4. A motor-driven power steering system according to claim 1, wherein decision of said interlock means for enabling or inhibiting the driving direction of said motor is made with hysteresis.

5. A motor-driven power steering system according to claim 1, wherein the threshold value referenced by said interlock means in the decision for enabling or inhibiting the driving direction of said motor is changed such that a range in which an inhibiting signal for inhibiting the driving direction is outputted is enlarged when said motor current is large.

6. A motor-driven power steering system according to claim 1, wherein the threshold value referenced by said interlock means in the decision for enabling or inhibiting the driving direction of said motor is changed based on whether said motor current is large or small.

7. A motor-driven power steering system according to claim 6, wherein decision as to whether said motor current is large or small is made with hysteresis.

8. A motor-driven power steering system according to claim 6, wherein a threshold value referenced by said interlock means in the decision for enabling or inhibiting the driving direction of said motor is changed when a state represented by the result of the decision as to whether said motor current is large or small exists continuously for a predetermined time.

9. A motor-driven power steering system according to claim 1, further comprising:

a phase compensation circuit for compensating phase of output of said steering torque detecting unit is additionally provided;

wherein said interlock means enables or inhibits the driving direction of said motor in dependence on the output of said phase compensation circuit.

10. A motor-driven power steering system according to claim 1, further comprising:

steering angle detecting means for detecting a steering angle of a steering wheel, wherein the threshold value referenced by said interlock means in the decision for enabling or inhibiting the driving direction of said motor is changed such that a range in which an inhibiting signal for inhibiting the driving direction is outputted is enlarged when the steering angle is greater than a predetermined value.

11. A motor-driven power steering system according to claim 1, further comprising:

steering angular velocity detecting means for detecting a steering angular velocity of a steering wheel, wherein the threshold value referenced by said interlock means in the decision for enabling or inhibiting the driving direction of said motor is changed such that a range in which an inhibiting signal for inhibiting the driving direction is outputted is enlarged when said steering angular velocity is higher than a predetermined value.

12. A motor-driven power steering system according to claim 1, further comprising:

motor vehicle speed detecting means for detecting a running speed of said motor vehicle, wherein the threshold value referenced by said interlock means in the decision for enabling or inhibiting the driving direction of said motor is changed such that a range in which an inhibiting signal for inhibiting the driving direction is outputted is enlarged when said running speed of said motor vehicle is higher than a predetermined value.

13. A motor-driven power steering system for a motor vehicle, comprising:

steering torque detecting means for detecting a steering torque applied to a steering wheel by a driver;

an electric motor for applying an assist torque to a steering mechanism for thereby assisting the driver in steering operation;

control means for outputting a motor driving signal for driving said motor in dependence on the output of said steering torque detecting means;

interlock means for enabling or inhibiting a driving direction of said motor in dependence on the output of said steering torque detecting means;

motor driving means for driving said motor in the direction enabled by said interlock means in accordance with said motor driving signal while disabling driving operation of said motor in a direction inhibited by said interlock means; and motor-applied voltage detecting means for detecting a voltage applied to said motor, wherein the threshold value referenced by said interlock means in the decision for enabling or inhibiting the driving direction of said motor is changed in dependence on said detected value of said motor-applied voltage.

* * * * *